(12) United States Patent
Berenguer

(10) Patent No.: US 10,499,619 B2
(45) Date of Patent: Dec. 10, 2019

(54) SYSTEM FOR POLISHING WALLS OF AQUATIC ENCLOSURES

(71) Applicant: ABYSSNAUT, Olliergues (FR)

(72) Inventor: Jerome Berenguer, Olliergues (FR)

(73) Assignee: ABYSSNAUT, Olliergues (FR)

( * ) Notice: Subject to any disclaimer, the term of this patent is extended or adjusted under 35 U.S.C. 154(b) by 140 days.

(21) Appl. No.: 15/552,402

(22) PCT Filed: Mar. 2, 2016

(86) PCT No.: PCT/IB2016/000216
§ 371 (c)(1),
(2) Date: Aug. 21, 2017

(87) PCT Pub. No.: WO2016/142762
PCT Pub. Date: Sep. 15, 2016

(65) Prior Publication Data
US 2018/0020645 A1    Jan. 25, 2018

(30) Foreign Application Priority Data
Mar. 6, 2015 (FR) ..................... 15 00439

(51) Int. Cl.
*B24B 29/02* (2006.01)
*A01K 63/10* (2017.01)
*B24C 3/06* (2006.01)
*B24C 9/00* (2006.01)
*B24B 57/02* (2006.01)

(52) U.S. Cl.
CPC .............. *A01K 63/10* (2017.01); *B24B 29/02* (2013.01); *B24B 57/02* (2013.01); *B24C 3/06* (2013.01); *B24C 9/003* (2013.01)

(58) Field of Classification Search
CPC ........ A01K 63/10; B24B 29/02; B24B 57/02; B24C 3/06; B24C 9/003
USPC .......................................................... 119/264
See application file for complete search history.

(56) References Cited

U.S. PATENT DOCUMENTS

| 3,337,889 A | 8/1967 | West |
| 4,622,780 A * | 11/1986 | Tingley ..................... B24B 7/24 |
| | | 451/359 |
| 5,806,463 A * | 9/1998 | Rising ................... A01K 63/04 |
| | | 119/245 |

(Continued)

FOREIGN PATENT DOCUMENTS

| EP | 1738642 A1 | 1/2007 |
| EP | 1947932 | 5/2007 |

(Continued)

OTHER PUBLICATIONS

International Search Report dated Jun. 29, 2016, for International Patent Application No. PCT/IB2016/000216.

*Primary Examiner* — Claude J Brown
(74) *Attorney, Agent, or Firm* — Karceski IP Law, PLLC

(57) ABSTRACT

A system for the polishing treatment of inner walls of aquatic enclosures includes at least one tank of abrasive mixture and at least one surface treatment head which communicates fluidically with the tank of abrasive mixture, a mover allowing the treatment head to be moved along the wall to be treated, and a supply allowing the treatment head to be supplied with a substantially continuous flow of abrasive mixture.

10 Claims, 4 Drawing Sheets

(56) References Cited

U.S. PATENT DOCUMENTS

| | | | | |
|---|---|---|---|---|
| 5,964,645 A * | 10/1999 | Jemt | ................. | B24B 7/182 |
| | | | | 451/354 |
| 2004/0102137 A1* | 5/2004 | Allison | ................. | B24B 37/22 |
| | | | | 451/28 |
| 2004/0133999 A1* | 7/2004 | Walton | ................. | B63B 59/10 |
| | | | | 15/1.7 |
| 2004/0216253 A1* | 11/2004 | Enoch, III | ................. | A47L 1/02 |
| | | | | 15/103 |
| 2010/0307545 A1* | 12/2010 | Osaka | ................. | B08B 3/024 |
| | | | | 134/198 |
| 2012/0260861 A1* | 10/2012 | Lindgren | ................. | A01K 75/00 |
| | | | | 119/232 |
| 2013/0192641 A1* | 8/2013 | Hausmann | ................. | B08B 1/002 |
| | | | | 134/18 |

FOREIGN PATENT DOCUMENTS

| | | | | |
|---|---|---|---|---|
| EP | 2012581 | | 11/2007 | |
| FR | 2175493 | A5 | 10/1973 | |
| FR | 2335269 | A1 | 7/1977 | |
| JP | H0354787 | U | 5/1991 | |
| WO | 0040080 | | 7/2000 | |
| WO | 2006078921 | A1 | 7/2006 | |
| WO | 2008006259 | A1 | 1/2007 | |
| WO | 2007127472 | A2 | 11/2007 | |
| WO | WO-2009110802 | A1 * | 9/2009 | ............... B08B 1/00 |

* cited by examiner

SYSTEM FOR POLISHING WALLS OF AQUATIC ENCLOSURES

CROSS-REFERENCE TO RELATED APPLICATIONS

This is a National Stage Entry into the United States Patent and Trademark Office from International PCT Patent Application No. PCT/IB2016/000216, having an international filing date of Mar. 2, 2016, and which claims priority to French Patent Application No. 15/00439, filed on Mar. 6, 2015, the entire contents of both of which are incorporated herein by reference.

TECHNICAL FIELD OF THE INVENTION

The present invention relates to a system for treating the walls of aquatic enclosures or basins. It relates more particularly to a system for polishing internal walls of aquatic enclosures. The present invention also relates to the corresponding polishing method.

STATE OF THE ART

In general, fauna and flora in a water enclosure must be able to live in the most natural way possible. Thus, aquatic enclosures need to be treated regularly, both for the welfare of living beings, and because of the natural and physical degradation they are subjected to. The water enclosures are intended to be visualized and must consequently comprise smooth and polished walls with a high quality of transparency. A polishing procedure for the transparent surfaces of the water enclosures must therefore be carried out regularly. Various processes in the state of the art make it possible to polish the transparent surfaces of aquariums. However, such processes often require not only intrusive means harmful to the life forms present in the aquatic enclosures, but also a heavy human intervention that is also not easily implemented.

In general, the polishing of transparent surfaces of aquatic enclosures is carried out by hand. The large enclosures are cleaned and polished by divers, who work in pairs and do the work manually. Such an approach is laborious, time-consuming and potentially dangerous to certain animals, such as sharks, that are in the aquatic enclosure, which means that one of the divers monitors the animals whilst his teammate performs the treatment. Another disadvantage arising from such a manual treatment is that it requires a certain number of teams of divers and a consequent duration of the treatment since the divers can remain under water only for relatively short periods.

Commonly, divers use abrasive disc polishers. Such polishing discs wear out very quickly and must therefore be replaced very often. They also have the disadvantage of rendering the dosage of the polishing force very delicate. In some cases, for example, when moving from a very soft disc to a very abrasive disc, an inattentive plunger can damage the wall to be treated. In addition, particles are released into the enclosure during treatment. Various types of devices are also known which make it possible to carry out polishing and/or cleaning operations from moving or control means provided on the outside of the enclosure. Several of these systems use magnetic means for connecting an external element to an internal element.

For example, patent application EP2012581 proposes a device for cleaning aquarium windows, and in particular for inner aquarium panes. This device comprises an element which can be positioned on the inner wall of the aquarium glass. The device also includes an external element which is positioned on the outer face of the wall. The internal and external elements of the device are respectively attracted by magnetic force so that the internal element of the device follows the movements of the external element. A cleaning surface is installed within the device, this surface is turned directly against the inner wall of the aquarium. The invention therefore incorporates the method of cleaning an inner surface of the glass of an aquarium.

The document EP1947932 also relates to an aquarium-cleaning device having an internal component comprising a plate serving as cleaning surface as well as an alternatively operative cleaning component arranged on a surface opposite to the surface to be cleaned. A magnetic element is placed on the plate and a flotation means is provided at one end of the plate. An external component includes a body attaching to the outer surface of a wall of the aquarium. A second magnetic element is carried by the body such that the body can be positioned between the two magnetic elements with the cleaning surface adjacent to the aquarium wall. By moving the body between the first and second positions, the internal component is moved inside the aquarium to clean different surfaces.

Also, application WO2008006259 describes a magnetic cleaner of aquarium panes comprising an internal cleaning element designed to slide on the inner surface of the window pane. This inner cleaning element comprises a front cover, a back cover, a magnet and a cleaning surface. The device also includes an external cleaner element positioned on the outer surface of the pane. The magnetic format between the internal and external cleaning elements allows the movement of the internal cleaning element by moving the external cleaning element.

Application EP1738642 relates to an internal surface cleaning device of an aquarium comprising an internal body. The internal body comprises a cleaning surface composed of foam, designed to be in contact with the wall to be cleaned. The internal body is displaced on the magnetic surface by the magnetic force linking it to an external component.

Document WO2007127472 constitutes yet another example of treatment and proposes a mechanism for the remote surface preparation, such as the cleaning of the inner surface of an aquarium managed from the outside. The cleaning device comprises a body provided with at least one magnetic element which is coupled, for the purpose of remote control, with complementary magnetic elements in a remotely located drive head. The mechanism includes an adjustment system for varying the intensity of the magnetic forces performing the coupling between the remote surface preparation assembly and the mechanism.

Finally, document WO0040080 describes a device for cleaning aquarium windows, in particular inner aquarium glass. The device comprises an internal element placed on the inner wall of the pane and an exterior element placed on the outer side of the pane of the aquarium. These internal and external elements attract each other under the effect of a magnetic force, so that the movement of the external element along the glass of the aquarium causes the same movement of the internal element. The device is characterized in that the element placed inside the aquarium is designed to float on the liquid medium contained in the aquarium when the magnetic force no longer applies.

Document FR 2335269 describes a housing receiving pressure due to the ambient environment because the device is immersed in water. The internal cavity is connected to a vacuum pump creating a low pressure zone inside the device. The pressure differential creates a device that adheres to the wall to be treated. There is a suction effect. It is possible to provide several zones of suction cups for greater flexibility. As a variant, the document describes a rotatable blade wheel which accelerates the particles projected against the wall.

The state of the art, as illustrated by the aforementioned documents, proposes systems for polishing and/or cleaning aquarium surfaces by various magnetic mechanisms. However, such processes have certain disadvantages. The magnetic force required for the surface treatment involves installing two elements on each side of the wall of the aquatic enclosure to be treated. This arrangement also makes it necessary to have an easy external access for the arrangements and positions to be cleaned, which is not always the case in practice. The treatment technique, in particular by magnetic mechanisms, is often limited to relatively thin walls, which excludes the treatment of large aquatic enclosures, the walls of which can be several tens of centimeters thick. Also, setting in motion the magnetic element fixed on the inner wall of the aquatic enclosure is generated by the movement of the external element, often by human intervention, excluding the automation of the process.

Automatic systems are also known, for example such as described in the application WO2006078921, which describes an automatic cleaning system for an aquarium. The cleaning system is programmed to clean the aquarium on a regular basis without requiring human intervention during the cleaning process. The cleaning system is configured to move along the side walls of the aquarium to clean the walls as it moves. Such a system is intended for small aquariums and small enclosures. Its action is restricted to the cleaning of the walls.

To overcome these various disadvantages, the invention provides various technical means.

DISCLOSURE OF THE INVENTION

Firstly, a first object of the invention is to provide a system and method for treating the walls of aquatic enclosures, allowing sanding and polishing of high optical quality of the transparent surfaces without harming the environment of living beings in the enclosure.

Another object of the invention is to provide a system that does not require the presence of one or more divers to remain in the enclosure during the entire duration of the treatment.

Still another object of the invention is to provide a method and a device for working in a continuous flow, without causing difficulties in terms of the amount of force to be applied.

Another object of the invention is to provide a device for treating the walls of aquatic enclosures which does not require moving the living creatures out of the aquatic enclosure during the polishing process. Another object of the invention is to provide a device for treating the walls of aquatic enclosures that makes it possible to conserve the water during and at the end of the polishing process. Still another object of the invention is to recover the particles resulting from the polishing operations. Finally, another object of the invention makes it possible to treat different configurations of walls of aquatic enclosures.

To this end, the invention provides a treatment system by polishing inner walls of aquatic enclosures or basins comprising at least one abrasive mixture tank and at least one surface treatment head in fluid communication with the abrasive mixture tank, as well as means for moving the treatment head along the wall to be treated, and means for supplying the abrasive mixture to the treatment head with a substantially continuous flow, wherein the treatment head comprises a containment chamber in which a treatment disc is rotatably arranged, wherein the treatment disc has a hollow rotating and feeding shaft connected to the abrasive mixture feeding means, wherein the treatment disc is connected to a treatment disc motor, and wherein the treatment disc carries a friction foam. Such an arrangement makes it possible to treat large-surface walls either automatically or semi-automatically with human intervention of limited duration in the enclosure. Such an architecture makes it possible to implement a friction polishing with direct contact of the disc against the wall to be treated. The disc, with its foam, is impregnated with abrasive particles, by a continuous flow, making the disc abrasive. The level of machining of the wall to be treated can be adjusted: by the intensity of the friction force between the disc and the wall and/or by the speed of the disc and/or by the more or less abrasive quality of the particles, and/or by the intensity of the flow of these particles. Such an arrangement makes it possible to carry out an efficient, well-dosed polishing both during the relatively intensive sanding phases when it is necessary to eliminate relatively deep scratches but also during the extremely fine optical polishing making it possible to restore the transparency of the internal PMMA walls (polymethyl methacrylate) of aquariums. Moreover, in order to properly manage the parameters for optimizing the optical polishing, the particle size of the abrasive particles can be adapted to very fine particles (for example of the order of a nanometer). Such an architecture of the containment chamber makes it possible to put in place a sealed working interface and to recover the particles. This also makes it possible to correctly manage the polishing parameters.

Also advantageously, the treatment system comprises a containment chamber which comprises one or more outlet orifices in fluid communication with at least one recovered mixture tank. Such an arrangement has the advantage of being able to recover the mixture used.

Advantageously, the treatment system is provided with means making it possible to move the treatment head along the wall to be treated, which comprise at least one horizontal rail and one vertical rail.

Advantageously, this arrangement constitutes an implementation that is simple, inexpensive and easy to assemble/disassemble. According to an advantageous variant, the treatment system comprises at least one movably mounted rail.

Advantageously, the treatment system comprises at least one thrust propeller of the treatment head which is placed on the treatment head substantially opposite or parallel to the containment chamber if there are several propellers. This arrangement makes it possible to adjust the holding force of the treatment head against the wall to be treated.

Also advantageously, the system comprises a circuit for recirculating the abrasive mixture. This makes it possible to reuse the abrasive mixture over several cycles, until saturation of the mixture.

The invention also provides a method of polishing internal walls of aquatic enclosures comprising the following steps:
  a surface treatment head is fed with an abrasive mixture;
  the abrasive mixture received is transmitted into a containment chamber of the treatment head;
  a treatment disc provided in the containment chamber is impregnated with the received abrasive mixture;

the rotating treatment disc treats the internal wall by friction of the disc against the wall;

the abrasive mixture used is discarded;

the surface treatment head is moved.

Advantageously, the distribution in an abrasive mixture is carried out in a continuous flow. Also advantageously, the recovered abrasive mixture is used in several treatment cycles.

Advantageously, the flow of abrasive mixture is regulated by the control system so that the pressure exerted inside the containment chamber is less than the external pressure of the ambient medium supplemented with the thrust of the propeller being exerted on the containment chamber.

Advantageously, provision is made for adjusting the pressure differential in order to facilitate the movement of the treatment head on the wall by limiting the friction at all levels of working depth and by ensuring the containment of the abrasive mixture in the containment chamber.

DESCRIPTION OF THE FIGURES

All the details of execution are given in the description which follows, supplemented by FIGS. 1 to 6, presented solely by way of non-limiting examples, and in which.

DETAILED DESCRIPTION OF THE INVENTION

Figure 1:
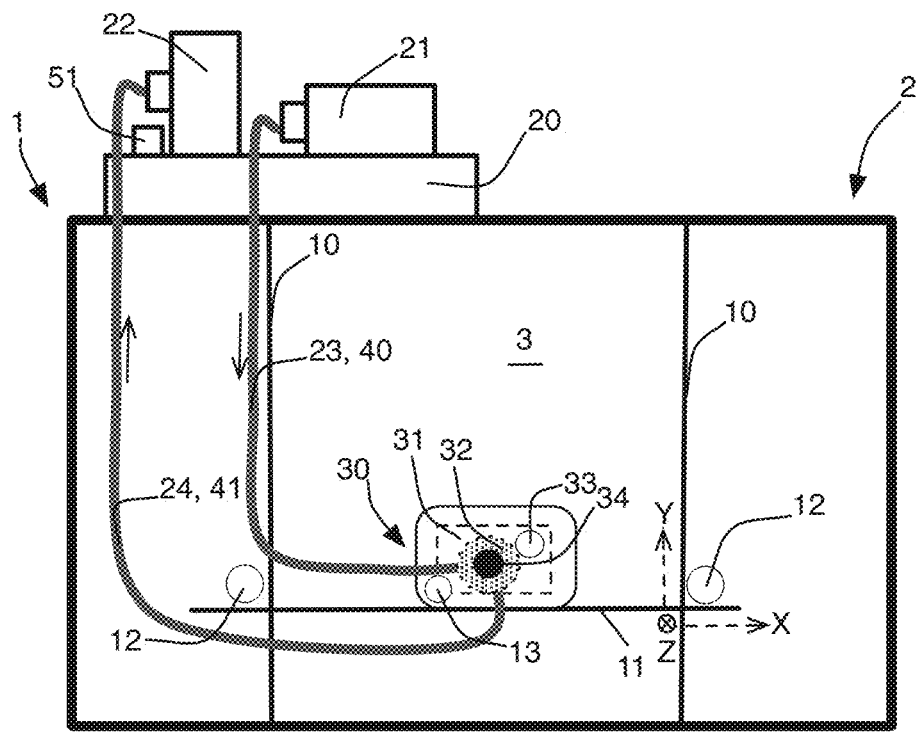
FIG. 1 is a front view from the inside of an aquatic enclosure of an example of a system for treating the walls of aquatic enclosures according to the invention.
Figure 2:
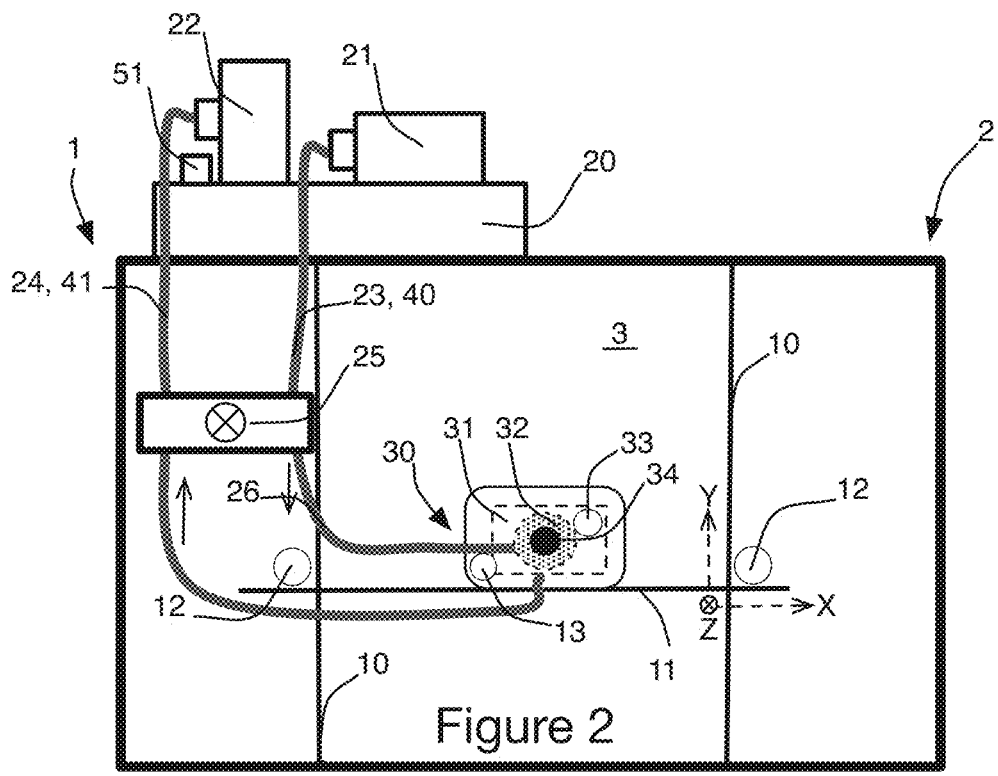
FIG. 2 is a front view of a variant embodiment of the treatment system of FIG. 1.

FIGS. 1 and 2 illustrate a first embodiment of a system for treatment by polishing of internal walls 3 of aquatic enclosures 2 according to the invention.

Treatment Head

As shown in FIG. 1, the treatment head 30 comprises a containment chamber 31 making it possible to cooperate in a sealed manner with the wall 3 to be treated. A treatment disc 32 is arranged in the containment chamber 31 and positioned to allow polishing of the wall 2 to be treated. The treatment disc 32 is in direct contact with the wall to be treated. It acts by friction against it. The treatment disc 32 can be driven in rotation by a motor 33 of the treatment disc. The treatment disc 32 is mounted on a hollow shaft 34 with a dual function serving as an axis of rotation and as a mixture feed tube. The shaft 34 guides the incoming mixture to the treatment disc 32, mounted to receive the incoming mixture. During treatment, the disc is thus constantly soaked with an incoming, fresh abrasive mixture 40. In the working position, the containment chamber 31 is isolated from the rest of the enclosure and makes it possible to recover the recovered abrasive mixture 41. The recovered abrasive mixture comprises PMMA (polymethyl methacrylate) particles extracted from the polishing and mixed with the fresh abrasive mixture 40.

Continuous Supply

In the examples illustrated in FIGS. 1 and 2, a platform 20 serves to support an abrasive mixture supply tank 21 and a recovered abrasive mixture tank 22. The platform 20 is advantageously arranged outside the aquatic enclosure 2, for example above the latter, as illustrated in FIG. 1.

The abrasive mixture supply tank 21 is designed to store the initial, fresh abrasive mixture 40. The recovered abrasive mixture tank 22 makes it possible to store the recovered abrasive mixture 41 recovered as a result of a polishing cycle. An abrasive mixture feed tube 23 makes it possible to connect the abrasive mixture supply tank 21 to the mixture feeding and rotating shaft 34. An abrasive mix return tube 24 makes it possible to connect the containment chamber 31 to the recovered abrasive mixture tank 22. A management box 51 is advantageously installed in the vicinity of the platform 20. The management box 51 groups all the information that can be used by the control box 50. The management box 51 makes it possible to receive and process the instructions coming from the control box 50 of the user.

FIG. 2 is an alternative embodiment of the system described in connection with FIG. 1. In this variant, the mode of feeding and recovering the mixture can be managed by an abrasive mixing distribution module 25. Depending on the selection mode chosen, the abrasive mixture distribution module 25 makes it possible to switch the abrasive mixture supply tank 21 and the recovered abrasive mixture tank 22. This characteristic of switching the tank 21 and 22 makes it possible, whenever a tank is empty, to use the other tank to ensure the supply. The system makes it possible to carry out a plurality of polishing cycles. At each cycle, the PMMA particle content of the recovered abrasive mixture 41 increases. When the mixture reaches a pre-established PMMA level, the spent mixture is removed from the circuit and a new abrasive mixture tank is connected to the system. For example, when the abrasive mixture supply tank 21 is empty, the recovered abrasive mixture tank 22 in turn feeds the treatment head 30, this time with a mixed mixture composed of abrasive and PMMA particles recovered from the preceding cycle or cycles.

Support and Displacement of the Treatment Head

According to the first embodiment illustrated in FIGS. 1 and 2, the treatment system 1 comprises various elements making it possible to ensure the support and the mobility of the treatment head 30. As illustrated, the system 1 comprises a horizontal rail 11 and two vertical rails 10. The latter can be fastened to the floor of the enclosure and on the surface, on fastening zones available in the vicinity of the wall 3 to be treated. The horizontal rail 11 is designed to allow the movement of the treatment head 30 by carrying out translation movements along the axis X. The translation of the treatment head 30 along the axis X is performed by a motor 13 for horizontal displacement provided in the treatment head 30. To facilitate the translation, rollers are advantageously arranged between the treatment head 30 and the horizontal rail 11. The horizontal rail 11 is itself mounted movably along the axis Y. The mobility of the horizontal rail 11 on the axis Y is enabled by two vertical displacement motors 12. By virtue of these two types of displacements, the treatment head 30 can be moved over the entire surface covered by the span of the rails 10 and 11.

Second Embodiment

Figure 3:
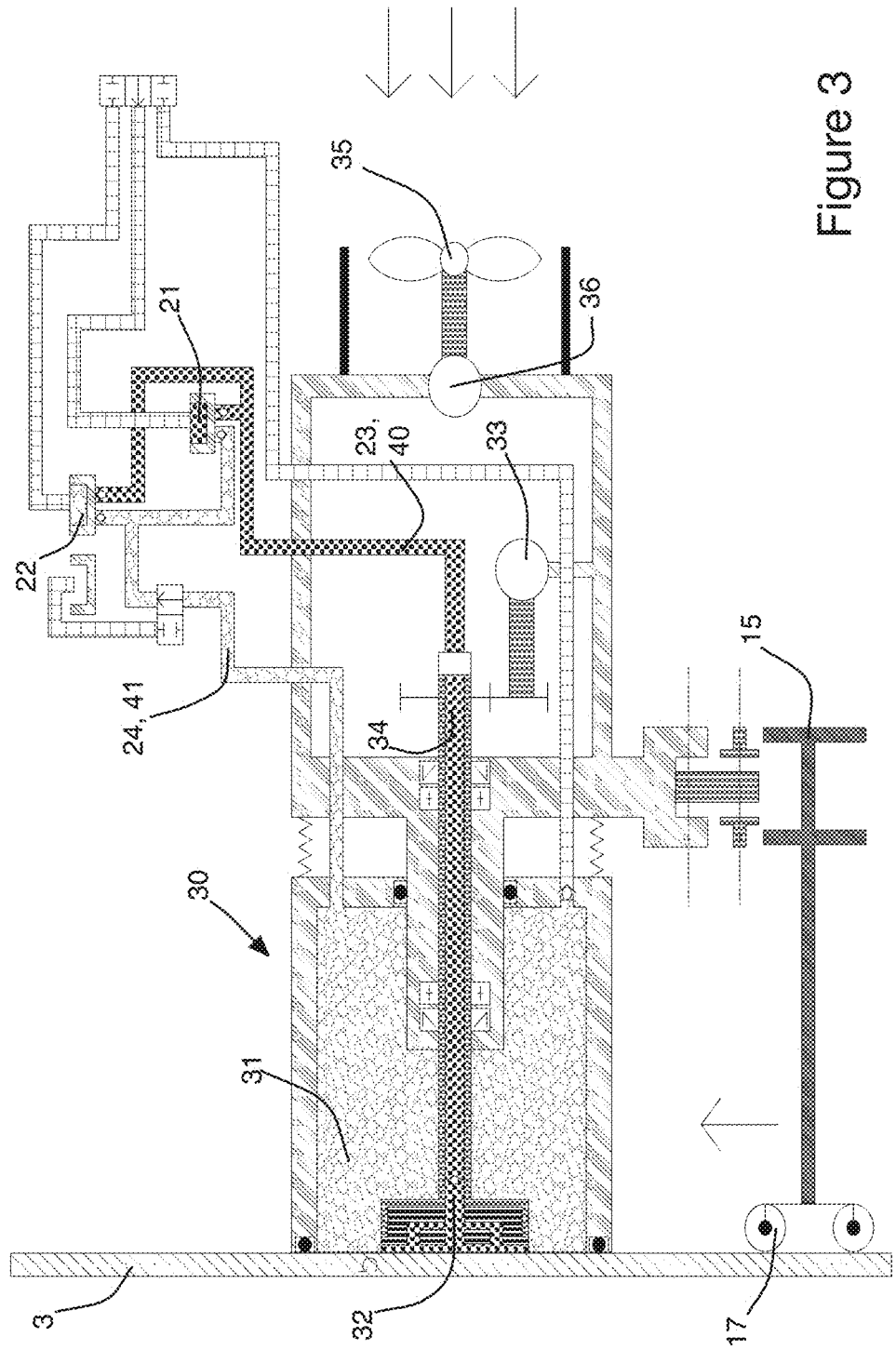
FIG. 3 is a schematic representation of a second embodiment of a treatment system in which the treatment head is shown in cross-section and is supplemented by the other elements of the system for treating the walls of water enclosures according to the invention.
Figure 4:
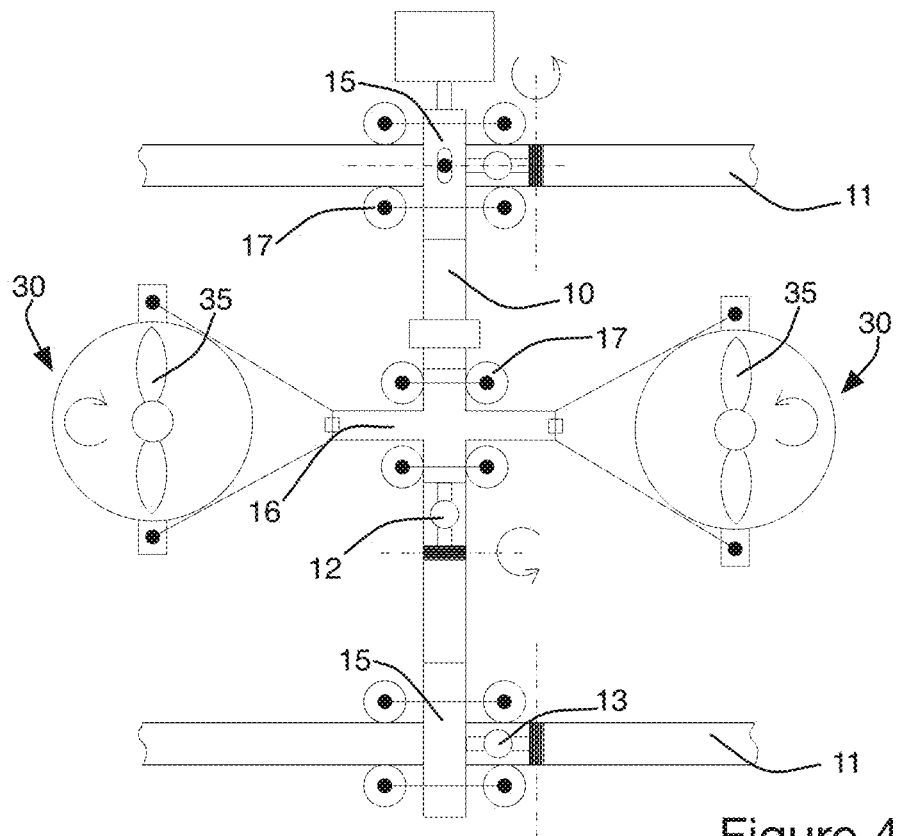
FIG. 4 is a rear view of the second embodiment of the invention.
Figure 5:
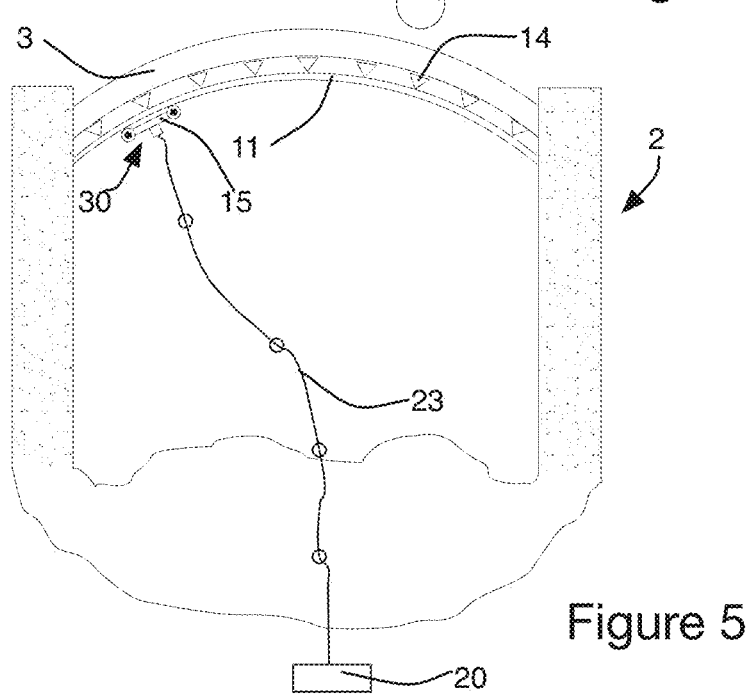
FIG. 5 is a view from above of an exemplary embodiment of the system according to the invention.

FIGS. 3 to 5 illustrate a second embodiment of the invention. This embodiment advantageously provides an abrasive mixture management by means of tanks arranged in tandem, namely a tandem for each particle size. There are preferably as many tandem tanks as there are particle sizes. The volume of each tank conditions the frequency of replacement of the fresh abrasive mixture 40. It is possible to use a single particle size, which implies translation speeds on the specific axis (x) and (y) and a repetition of runs per unit of surface to be adapted. If there is no translation on the axis (x) and (y) of the treatment head 30 until the unit area is completely renovated, it is then necessary to ensure a thermal equilibrium between the fresh abrasive mixture 40 and the treated PMMA surface which can undergo in this case an inconsistent superficial and punctual heating. If several particle sizes of fresh abrasive mixtures 40 are used, a rinsing phase of the circuits may be provided prior to the change of the tandem tanks.

Treatment Head

As illustrated, the treatment head module preferably consists of two treatment heads 30 or multiples thereof. The main rotating elements are the thrust propeller 35 and the treatment disc 32. The treatment heads 30 are advantageously mounted so as to counteract each other in order to cancel the rotation torque. This embodiment is specifically designed to limit the stresses on the gantries and the guiding device of the axis (x) and (y).

In this perspective, the assembly of treatment heads 30 and driving carriages (y) (described later in connection with FIG. 4) are in neutral buoyancy in water, in order to limit the stresses on the gantries and to facilitate the translation movements. The role of the treatment head 30 is paramount since the latter is in direct contact with the PMMA wall 3 to be treated and makes it possible to polish the material in order to erase the different scratches and opacities. The frame of the treatment head 30 can move freely on its axis (z) a few centimeters forward and backward. This allows the treatment head thrust propeller 35 to press the containment chamber 31 on the panel or to release it. This also makes it possible to carry out the various phases of the cycle without generating mechanical stress on the structural elements of the rails, while maintaining perfect guiding on the three axes. To optimize the process, the thrust exerted by the propeller 35 added to the external pressure of the ambient medium is slightly greater than the opposite force resulting from the internal pressure in the containment chamber 31. Furthermore, the pressure in the containment chamber 31 is less than the external pressure of the ambient medium supplemented with the thrust of the propeller exerted on this chamber. The treatment head 30 is moved along the axis (y) thanks to the vertical motor carriage 16. The treatment head 30 descends under water, its vertical motor carriage 16 rolls on the vertical rail 10. The treatment head 30 stops a few tens of cm below the surface. The water of the enclosure penetrates into the containment chamber 31. Non-return valves from the treatment disc and the air injection hose prevent water from entering into the circuits. The distributor of the exhaust pipe is in the purge position. The treatment head propeller 35, driven by an electric motor 36, rotates. This generates a thrust allowing translation of the treatment head 30 along the axis (z). This thrust force, in a first stage, causes the friction foam of the treatment disc 32 to press against the PMMA wall 3, projecting with respect to the plane of the axial clamping of the containment chamber 31. This generates the partial crushing of the friction foam and the compression of any springs of the treatment disc 32, which, in a second stage, results in the containment chamber 31 being pressed against the PMMA wall 3. The density and shape memory of the friction foam as well as the stiffness of any compression springs of the treatment disc 32 contribute to making a contact and a frictional force of the foam of the treatment disc 32 that are relatively constant even during thrust variations of the propeller 35 on the containment chamber 31. The propeller 35 generates a static thrust that is constant and adjustable on the containment chamber 31 once it is pressed onto the wall 3. The containment chamber 31 has a seal at its periphery, mounted in axial bearing in order for the clamping on the wall 3 to be sufficiently sealed. This avoids leaks of the fresh abrasive mixture 40 and air leakage during the purge and rinsing phases. The containment chamber 31 may optionally be equipped on its outer wall with damping springs and an adjustment device making it possible to adjust the position of its sealing plane of the axial clamping with respect to the friction foam of the treatment disc 32.

The compressed air distributor switches to the purge position. The air enters the containment chamber 31 and expels the water which escapes through the exhaust pipe and returns to the drainage tank. Once the purge is complete, the intake of the fresh abrasive mixture 40 can begin. The distributor of the exhaust pipe switches to the return position on the tank No. 2 of the first tank tandem. The compressed air distributor switches to the abrasive mixture feed position. The pressurized air is injected into the tank No. 1 of the first tank tandem, containing the abrasive mixture of the first particle size.

The fresh abrasive mixture 40 descends into the feed tube 23 and passes through the dynamic mechanical seal gasket which equips the hollow shaft of the treatment disc 32 carrying the friction foam. The fresh abrasive mixture 40 fills the central chamber of the foam, and then the peripheral distribution channels. The electric drive motor of the treatment disc 32 rotates. The operation of treating the PMMA wall 3 begins. The speed of the treatment disc 32 carrying the polishing foam is variable so as to allow the selection of a speed well adapted to the operating parameters such as the quality of the abrasive agent present in the fresh abrasive mixture 40, the nature of the imperfections to be polished, the speed of movement of the head, etc. The fresh abrasive mixture 40 is projected against the wall 3 to be polished under the effect of the centrifugal force and of the flow of the fresh abrasive mixture 40 produced by the supply circuit. Gradually all the volume of the containment chamber 31 is filled with some fresh abrasive mixture 40 which then escapes through the exhaust pipe and returns to the tank No. 2 of the first tank tandem. A layer of fresh abrasive mixture 40 is held between the foam and the wall 3, resulting from the thrust generated by the propeller 35 on the polishing plate and by the flow of the fresh abrasive mixture 40 produced by the pressure of the air in the tank No. 1.

A few seconds after the treatment disc 32 begins to rotate, the translation of the treatment head 30 on the axis (x) begins. This translation is produced by the driving rollers of the vertical rail which rolls on the horizontal rails. The abrasion produced loads the fresh abrasive mixture 40 with PMMA particles. This implies providing a volume of offloading in the tandem tanks to allow the progressive saturation of the recovered abrasive mixture 41 with PMMA particles. It is also necessary to control the gradual thickening of the abrasive mixture, since too great a viscosity of the latter due to the PMMA particulate loading could create excessive heating of the wall. When tank No. 1 is almost empty, the compressed air distributor stops the injection of air and supplies the tank No. 2. The presence of the non-return valves on the tanks allows the alternating circulation of the fresh abrasive mixture 40. Thus, the tank No. 2 becomes the supply tank and the No. 1 the return tank. This is why we talk about tandem tanks for each particle size.

The recycling system for the fresh abrasive mixture 40 allows:
- a large flow of the fresh abrasive mixture 40 in the containment chamber 31, thus limiting heating;
- an interface layer thick enough to promote the smoothest and most efficient abrasion possible;
- an optimization of the duration of use of the mixture per unit area before its viscosity becomes inconsistent.

Continuous Supply

Still referring to FIGS. 3 and 4, the fixed platform module represents the logistics station of the machine. It is this module which stores and distributes all mixtures to the treatment heads 30. This module also distributes electrical power to all motors and systems that need it. It produces compressed air and also carries the central control block of the control station module. In the example illustrated, this module consists of the following subassemblies: a roller frame, a mains connection, one or more electric current transformers, a low pressure air compressor and its tank, an assembly of tanks for abrasive mixtures (tandem tanks), a purge tank, a pneumatic manifold assembly, a water and abrasive mixture dispenser assembly, a pneumatic and hydraulic regulating device, a central control block, a water inlet connection of the network. The platform 20 is preferably positioned in the technical chambers of the tank or aquarium, as close as possible to the access to the surface above the PMMA wall 3 to be treated. The frame on wheels of this module allows this setup. Indeed, it is desirable to reduce as much as possible the lengths of the cables and of the pipes, connected to the modules installed on the PMMA wall 3. Once the location of the platform has been determined, the operator makes connections to the cables and pipes on the junction box of the horizontal rails. The platform 20 is no longer caused to be moved for the duration of the work site. The platform 20 is also connected to the electrical sector and to the water network. When all modules are operational, operations can begin. The operator, thanks to the control box 50, triggers the general powering up of the platform 20. The tandem tanks have been filled with fresh abrasive mixture 40 beforehand. The purge and rinse tank is empty. The operator switches on the low-pressure air compressor to pressurize the buffer tank. Once the operating pressure is reached, the system is operational. The management box 51, under the orders of the operator, feeds the control circuits of the distributors thanks to its dedicated control board. The distribution of the fresh abrasive mixtures 40 to the treatment heads 30 begins, as well as the collection of physical parameters for monitoring the system. The power supply is ensured by the transformer and the dedicated control board to power all the electric motors of the machine. In this exemplary embodiment, the polishing method is described with a manual approach. Alternatively, several of the presented steps can also be implemented according to an automated approach. According to the second embodiment of the invention, the mobility of the treatment heads 30 is ensured by a system of rails comprising two pairs of rails arranged substantially perpendicularly. In the following, the horizontal rails 11 and the vertical rails 10 will be described, with reference to FIGS. 4 and 5.

The Horizontal Rails

This module represents the guiding elements of the vertical rails 10 and of the treatment heads 30 on the axis (x) by allowing their translation on this axis so that the vertical rails are substantially perpendicular to the surface of the water. In the example illustrated, this module consists of three sets of elements, namely the surface guide rail, the bottom guide rail and the junction box.

The Guide Rail Surface

This set of elements is installed by diving operators on the PMMA wall 3 to be treated. It is installed a few centimeters above the water surface of the enclosure. In the example illustrated, the assembly comprises the following elements: a plurality of pneumatic support suction cups and a plurality of rail sections. The suction cups 14 are preferably positioned equidistantly from the top end of the PMMA wall 3. They are interconnected by a pneumatic pipe of the pneumatic fastening circuit. The suction cups 14 are connected in parallel to the pneumatic circuit: their operation is independent. A small pneumatic junction box is integrated into the first support suction cup to distribute the compressed air to the suction network. This suction cup is called "feeder suction cup". Thus, by the play of the pressure delta generated by the pneumatic circuit in the dry chamber of the suction cup, the clamping of the latter onto the wall 3 is very powerful. An anti-return valve on the suction cup limits the problems of detaching in case of leakage of the circuit. Once this network of suction cups is installed, the section rails can be put in place. The rail sections are, for example, plates of HDPE (High Density Polyethylene) or plastic material with good flexibility without risk of fracture, matching the possible radius of curvature of the PMMA wall 3 to be treated. By way of example, the length of the rail sections may be between 0.5 and 2 meters in length according to the configurations of the aquarium enclosure. The rail sections are fastened to the anchoring suction cups, at the rate of two or three anchoring points. A mounting flange is used to secure the rails to each other. Preferably, a line pre-alignment device is used which is positioned on the PMMA panel at the time of mounting the support suction cups. The drilling diameters of the fastening screws on the rail sections are such that they make it possible to adjust the rails with respect to one another. The repositioning of the anchoring suction cups is possible while the rails are assembled. When the dimensions of the PMMA wall 3 to be treated make it possible to use only standard lengths of rail sections, a so-called "coupling" rail section is used. This rail section is a custom-made plate for fitting. It can be made on site.

The Guide Rail Melts:

This set of elements is installed by diving operators on the lowest part of the PMMA panel. The assembly comprises the following elements: a plurality of pneumatic support suction cups and a plurality of rail sections. The installation operations are similar to those of the surface rail. A feeder suction cup, connected to the surface suction cup, is used. The suction cups are positioned equidistantly with respect to the bottom end of the PMMA wall 3.

The Junction Box:

In the example shown, a junction box is positioned in a dry place very close to the access to the water surface of the enclosure and, if possible, also positioned approximately in the middle of the body of water and on the side opposite to the PMMA wall 3. This junction box allows all power supplies and returns of the fixed surface platform module to be connected to the vertical gantry module and to the treatment heads 30 of the machine. It acts as an anchor and pivot point. Indeed, the cables and pipes connected from the box to the gantry are very flexible and are equipped with floats in order to follow the movement of the vertical gantry by deploying on the surface of the water without causing entanglement and excessive stress. It also allows compressed air to be fed to the suction cups fastening circuits.

The Vertical Rails

This module represents the guiding elements of the treatment heads 30 on the axis (y) but also the motor elements of the axis (x) and (y). In the illustrated example, this module consists of the following assemblies: the guide rail, the motor carriages (x), the motor carriage (y), the junction boxes, and the guide rail. This assembly constitutes the guide and the rolling path of the axis (y). It is installed by the diver operators after laying the horizontal rails. In the example illustrated, it comprises the following elements: a plurality of rail sections with coaxial corrector, a plurality of rail sections, and a plurality of connecting sections. After taking into account the depth of the enclosure 2 and therefore the length of the segment between the median axis of the surface guide rail and the median axis of the bottom guide rail, it is possible to assemble the guide rail. As for the horizontal gantry, the rails are, for example, plastic plates whose buoyancy is neutral (to facilitate mounting and ease stresses on the horizontal rails). These plates are assembled together by means of flanges and spacers. The guide rail is a double planar assembly, with cylindrical spacers in order to obtain a high rigidity over lengths which can represent several meters. The rail sections with coaxial corrector have an oblong hole: it is the first rail section from the top of the enclosure 2. This oblong hole makes it possible to fasten it to the motor carriage (x) of the surface rail and makes it possible to correct misalignments of the rails of the horizontal gantry during the translations on the axis (x). The connections, as for the horizontal rails 11, ensure the tailored connection if the standard rail sections do not make it possible to obtain the desired height. They can be adjusted on site.

Driving Carriages (x):

In the example illustrated, the assembly consists of the two driving carriages of the axis (x) which allow the translation of the gantry on the axis (x). The first is installed on the surface rail and the second on the bottom rail. The guide rail is fixed at the top on the first driving carriage and at the bottom on the second. In the example illustrated, the motor carriages (x) comprise the following elements: a frame, guide rollers 17, a motor and motor roller, an adjustment system and leak-tight connections. The frame of the carriage allows the four guide rollers 17 to be fastened and rotated. A fastening pin allows the rail section to be connected to coaxial connector on the upper carriage. The guide rollers 17 roll in pairs, i.e. two on the upper edge and two on the bottom edge of the plates of the horizontal rail sections. Thus they integrally unite the frame to the rail but also allow its horizontal translation. The frame is equipped with an electric motor and a gearbox in a leak-tight box. At the output of the gear unit, the shaft is equipped with a motor roller. This motor roller is for example a rubberized wheel which drives the carriage and thus the vertical rail in translation on the axis (x). The rolling path of this motor roller is the outer face of the plates of the horizontal rails 11. The motor carriage (x) of the upper part has a support for fastening the junction box. The geared motor unit and the motor roller are mounted on an adjustable frame in order to be able to modify the intensity of the support of the driving roller on its rolling path and to generate sufficient adhesion to carry out the translation. The carriage motors are connected to the junction box dedicated to the driving carriages (x) thanks to cables equipped with leak-tight connector. The two motor carriages (x) are preferably always fed at the same time by the platform 20.

The Driving Carriage (y):

In the example illustrated, this assembly consists of the motor carriage of the axis (y) which allows translation of the treatment heads 30 on the axis (y). It comprises the following elements: a frame, guide rollers, a motor and motor roller, an adjustment system, leak-tight connections. The frame of the motor carriage (y) has the same guiding principle in terms of the guide rollers 17. It integrally unites the frame to the vertical rail and allows its translation on the axis (y). The driving carriage (y) has the same system of movement as the carriages (x), with watertight box, geared motor, motor roller and motor roller adjustment system, as well as leak-tight connections for its motor. The frame of the driving carriage (y) has, in addition to the others, fastening devices on each side on the horizontal plane. These devices make it possible to fasten the treatment heads 30 on each side. Moreover, they make it possible to adjust the angle of parallelism of the treatment heads 30 relative to the PMMA wall 3 and then to lock them in the chosen position. This system makes it possible to adapt to large radii of curvature of the wall 3.

Junction Boxes:

The frame of the driving carriage (y) is equipped with a connector box which allows the power supply circuit of its drive motor to be connected, but also the supply to all the electric motors of the treatment heads 30 and the pipes of the various mixtures. The connector box of the motor carriage (y) is connected to the general junction box of the horizontal gantry which is located in the dry area and which is connected to the platform 20.

Figure 6:
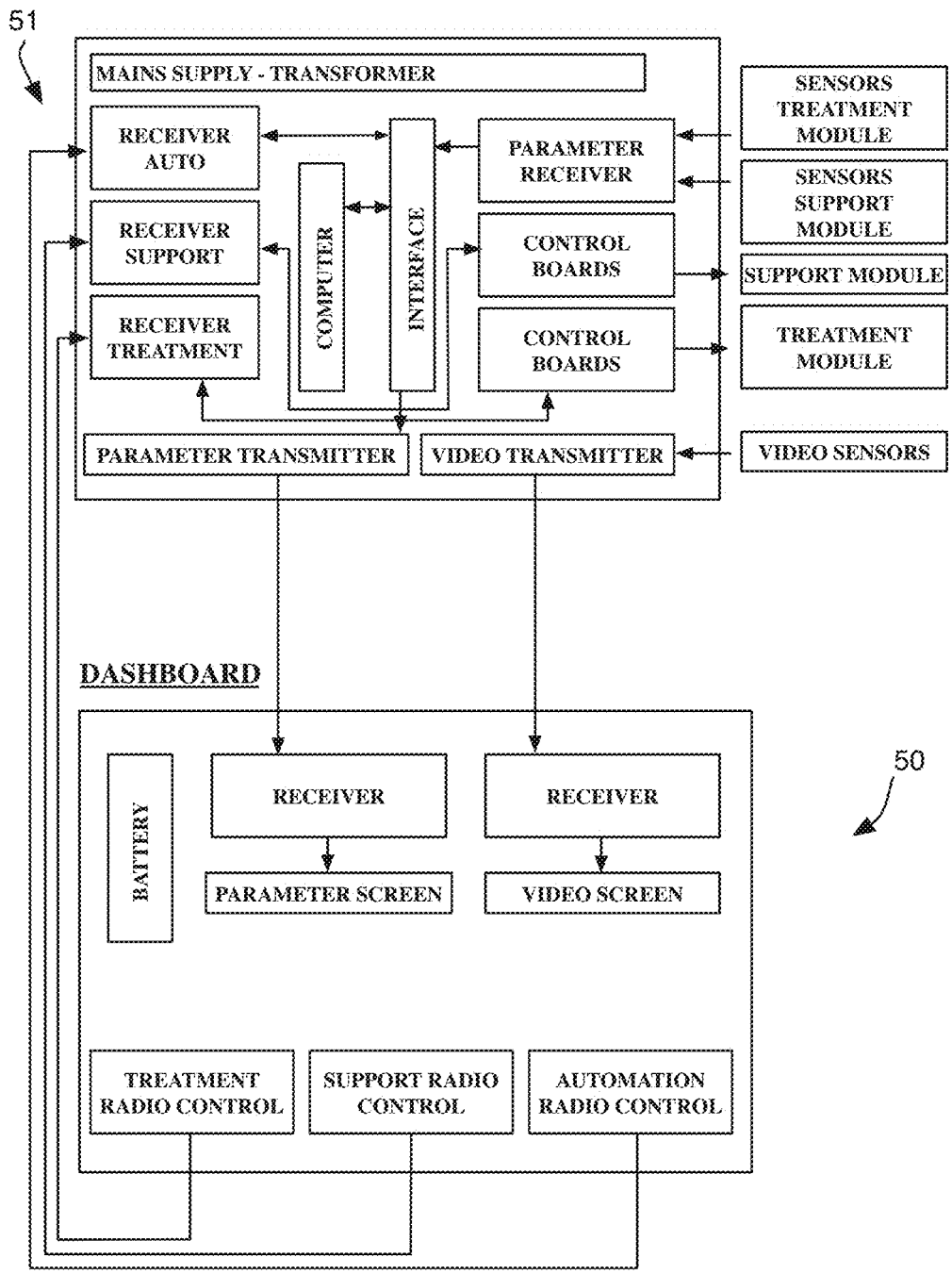
FIG. 6 is a schematic representation of the constituent elements of the management box and of the control station according to the invention.

The Control Station Module:

As illustrated in FIG. 6, the role of the control station module is to give the operator access to all system commands and parameter monitoring. This module allows manual, semi-automatic or automatic control of the machine. The control box is installed on the "dry side" of the PMMA panel to be processed. The operator thus has a visual display in a dry environment of the panel, enabling him to assess optimally and in real time the results of the processing operations (the visual is much less precise in a submerged environment). Moreover, the operator is much less physically tested in a dry environment than in a submerged environment, and potentially safer in the case of enclosures containing dangerous animals. This control station module is constituted by two sets of elements in radio and wire contact: either a first assembly which is a control box 50, and a second assembly which is the management box 51. The HMI device can be moved with its castors, in order to follow the progress of the treatment along the PMMA wall 3 on the dry side. This HMI device has three radio controls, two receivers, and two screens. The treatment radio control unit communicates by radio wave with the receiver "treatment functions" located in the management box 51 on the platform 20. It allows the operator to manually execute the functions of the immersed modules and installed on the PMMA wall 3 to be processed. Its functions are, for example, moving the treatment heads 30 on the three axes more or less rapidly, rotating the thrust propellers 35 and varying their rotational speed in order to modify and adjust the thrust generated by the latter and rotating the polishing platens and varying their rotational speed if necessary. The support radio control unit communicates by radio wave with the receiver "support functions" located in the management box 51 on the platform 20. It makes it possible to manually execute the functions of the module of the platform 20 which supplies the vertical rail(s) and the treatment heads 30 with low-voltage direct current, fresh abrasive mixture 40, compressed air and water.

The radio control functions are, for example, changing the position of the pneumatic distributors, changing the position of the purge and return valves, modifying the pressure in the circuits, and powering up the electrical circuits. The radio control unit of the automatic functions communicates by radio wave with the receiver "automatic functions" located in the management box 51 on the platform 20. It allows the operator to trigger automatic phases on the immersed modules and on the platform 20. The parameter receiver receives the information from the management box 51 by radio wave and displays the following parameters in real time on the dedicated screen: the pressure of the compressed air circuits, the pressure of the supply circuits for the fresh abrasive mixture 40, the level of the tandem tanks, the thrust of the propellers 35, the speed of the polishing plates, the speed of movement along the axis (x) and (y), the temperature of the fresh abrasive mixture 40 in the containment chamber 31, the temperature of the fresh abrasive mixture 40 in the tanks 21 and 22, the viscosity of the fresh abrasive mixture 40, and the state of the electrical circuits. The video receiver radio receives the video signals from the management box 51 by radio wave and displays the images on the dedicated screen. This video screen allows the operator to visualize certain anomalies as well as the possible interactions with the living elements of the intervention environment. The management box 51 is preferably located on the platform 20. This is the heart of the control station module. This is where all information is centralized and used. In the example illustrated, the management box 51 comprises four receivers, two transmitters, and a computer. The control commands, sent by the operator using the radio controls of the HMI device, are received by the support, processing and automation receivers located in the management box 51. The processing receiver communicates directly with the treatment module board which will make it possible to vary the power current of the translation motors of the axis (x) and (y), but also those of the propellers and the polishing plates. The support receiver communicates directly with the support module board on the platform 20 and will enable servo-controls acting on the suppliers of compressed air, fresh abrasive mixture 40 and of power supply for the various circuits to be actuated. The automation receiver communicates with the computer interface of the management box 51. This will take into account the partial or total control of the machine, depending on the choice of the operator. The computer then communicates with the control boards via the interface. The parameter receiver receives, via radio or wired link, the information coming from the sensors of the various parameters. These sensors are placed at different points of the system according to whether they indicate pressure, velocities, temperatures, flow rates, etc. The parameter receiver communicates with the interface of the computer which can use this information when it controls the machine in automatic mode. The computer and the interface also communicate the parameters to the parameter transmitter so that the operator can view them on the dedicated screen. The video sensors transmit their signals to the video screen of the control box 50 via the video transmitter. The power supply to the control station will be provided by batteries for the control box 50 and by the mains with transformer for the management box 51. All the power and servo power supplies advantageously pass through the management box 51.

The invention claimed is:

1. A system for polishing internal walls of aquatic enclosures, comprising:
at least one abrasive mixture tank;
at least one treatment head in fluid communication with the abrasive mixture tank;
a mover for moving the at least one treatment head along one of the internal walls along X and Y axes; and
a supply for supplying an abrasive mixture to the at least one treatment head with a substantially continuous flow; and
a treatment head propeller driven by an electric motor for generating thrust allowing displacement of the at least one treatment head along a Z axis,
wherein the at least one treatment head provides a single phase underwater treatment of the internal walls,
wherein the at least one treatment head comprises a containment chamber, a treatment disc rotatably arranged in the containment chamber, and a hollow rotating and feeding shaft connected to the treatment disc and to the supply,
wherein the treatment disc is connected to a treatment disc motor,
wherein the treatment disc carries a foam, and
wherein, in operation, a thrust exerted by the treatment head propeller added to an external pressure of an ambient medium is slightly greater than an opposite force resulting from an internal pressure in the containment chamber, thereby enabling a layer of the abrasive mixture to be held between the foam and the internal wall.

2. The system according to claim 1, wherein the containment chamber comprises at least one outlet orifice in fluid communication with at least one recovered abrasive mixture tank.

3. The system according to claim 1, wherein the mover comprises at least one horizontal rail and at least one vertical rail.

4. The system according to claim 3, wherein at least one of the rails is movably mounted.

5. The system according to claim 1, further comprising a circuit for recirculating the abrasive mixture.

6. The system according to claim 1, wherein the at least one treatment head includes a plurality of treatment head thrust propellers disposed in parallel.

7. A method for treating internal walls of aquatic enclosures, comprising a single phase underwater treatment, the method comprising:
feeding a surface treatment head with an abrasive mixture;
transmitting the abrasive mixture into a containment chamber of the surface treatment head;
generating, by a propeller, a thrust allowing displacement of the treatment head along a Z axis;
impregnating a treatment disc provided in the containment chamber with the abrasive mixture;
rotating the treatment disc carrying a foam;
adjusting the thrust such that the thrust exerted by the propeller added to the external pressure of an ambient medium is slightly greater than an opposite force resulting from an internal pressure in the containment chamber, thereby enabling a layer of the abrasive mixture to be held between the foam and one of the internal walls for treating the one of the internal walls;
recovering the abrasive mixture after use; and
moving the surface treatment head along X and Y axes with a mover.

8. The method according to claim 7, wherein distribution of abrasive mixture is carried out in a continuous flow.

9. The method according to claim 7, wherein the recovered abrasive mixture is used in several treatment cycles.

10. The method according to claim 7, wherein a pressure differential is adjusted to facilitate movement of the surface treatment head on the one of the internal walls by limiting friction at all levels of working depth of the surface treatment head while ensuring containment of the abrasive mixture in the containment chamber.

\* \* \* \* \*